United States Patent [19]

Kouno et al.

[11] Patent Number: 5,309,258
[45] Date of Patent: May 3, 1994

[54] PATTERN IMAGE GENERATION DEVICE FOR IMAGE PROCESSING SYSTEM

[75] Inventors: Katsuyuki Kouno; Kazuhisa Sato, both of Kanagawa; Masayasu Kurosawa, Tokyo; Isao Kuwahara, Tokyo; Mitsuo Fukitomi, Tokyo, all of Japan

[73] Assignee: Fuji Xerox Co., Ltd., Tokyo, Japan

[21] Appl. No.: 994,096

[22] Filed: Sep. 11, 1992

[30] Foreign Application Priority Data

Sep. 13, 1991 [JP] Japan .................. 3-234921

[51] Int. Cl.⁵ .................. G03F 3/08; H04N 1/46
[52] U.S. Cl. .................. 358/523; 358/530; 358/537; 358/432
[58] Field of Search ............... 358/523, 537, 530, 518, 358/444, 460, 443, 452, 448, 504, 506

[56] References Cited

U.S. PATENT DOCUMENTS 4,752,822  6/1988  Kawamura .................. 358/523
4,805,013  2/1989  Dei et al. .................. 358/523
5,079,624  1/1992  Sasuga et al. .................. 358/530

FOREIGN PATENT DOCUMENTS 2-70173  9/1990  Japan .

Primary Examiner—Edward L. Coles, Sr.
Assistant Examiner—Scott A. Rogers
Attorney, Agent, or Firm—Finnegan, Henderson, Farabow, Garrett & Dunner

[57] ABSTRACT

A pattern image generation device which is able to generate various patterns by use of a RAM for processing ordinary image data and also is able to generate the patterns in a simple structure. The pattern image generation device includes an image conversion processor for converting an input image data signal to output a converted image data, the image conversion processor including rewritable memory and address controller for controlling a memory address of said memory, and an operation processor for controlling the operation of the image conversion processor.

8 Claims, 16 Drawing Sheets

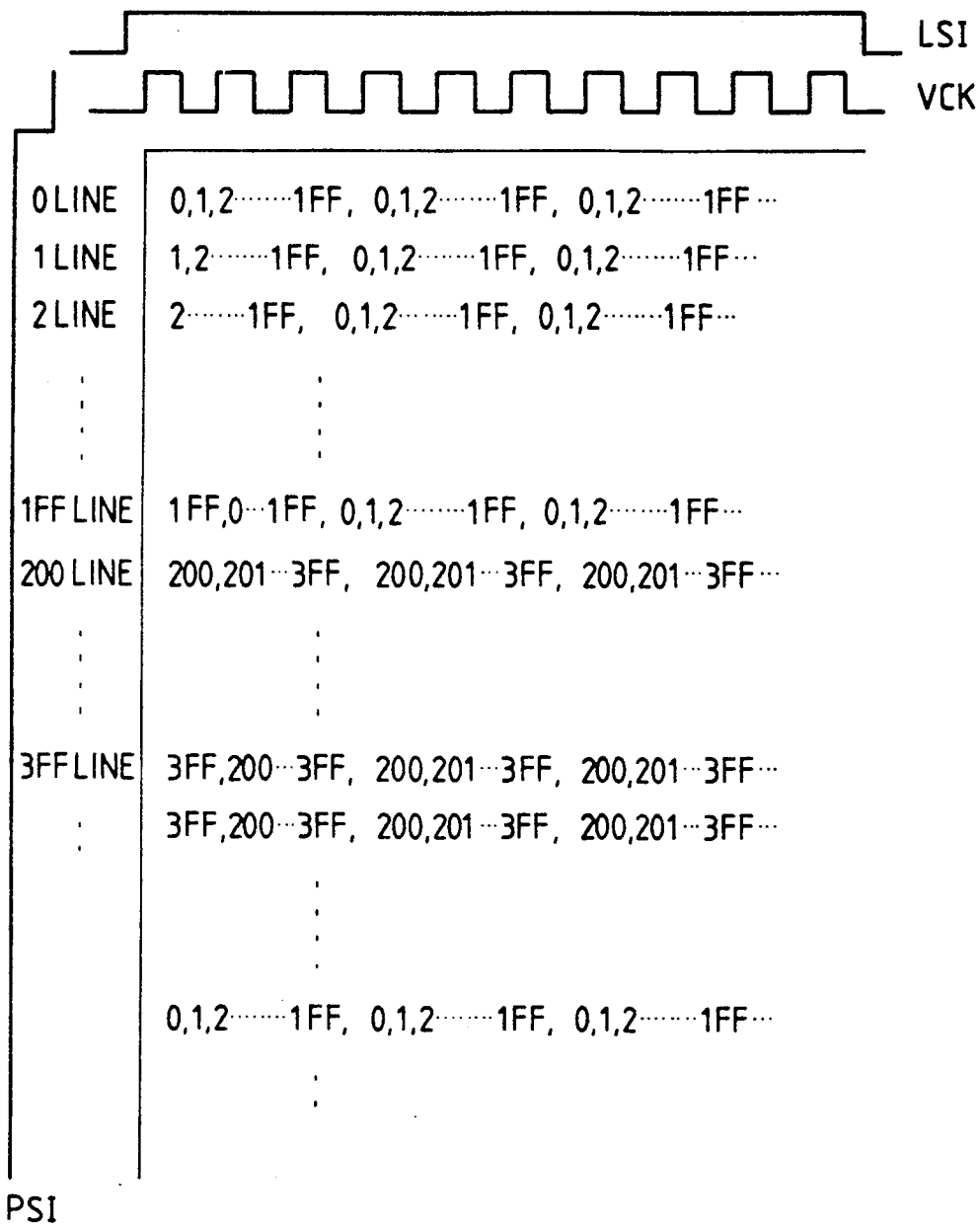

FIG. 5(a)

| ADDRES | ENR FOR B | ENR FOR G | ENR FOR R | ADDRES | ENR FOR B | ENR FOR G | ENR FOR R |
|---|---|---|---|---|---|---|---|
| 000H~012H | AE | 80 | 80 | 100H~1FFH | SIMILAR TO 000H ~0FFH, SET TO "AE→93", "51→6C" "86→85", "79→7A" | | |
| 013H · 014H | 80 | 80 | 80 | | | | |
| 015H~027H | 80 | AE | 80 | 200H~2FFH | SIMILAR TO 000H ~0FFH, SET TO "AE→BA", "51→75" "86→84", "79→7B" | | |
| 028H · 029H | 80 | 80 | 80 | | | | |
| 02AH~03CH | 80 | 80 | AE | 300H~3FFH | SIMILAR TO 000H ~0FFH, SET TO "AE→FF", "51→00" "86→FF", "79→00" | | |
| 03DH · 03EH | 80 | 80 | 80 | | | | |
| 03FH~051H | 51 | 51 | 51 | 400H~4FFH | SIMILAR TO 000H ~0FFH, SET TO "AE→E2", "51→1D" "86→E2", "79→1D" | | |
| 052H · 053H | 80 | 80 | 80 | | | | |
| 054H~066H | AE | AE | AE | 500H~5FFH | SIMILAR TO 000H ~0FFH, SET TO "AE→D9", "51→26" "86→D9", "79→26" | | |
| 067H · 068H | 80 | 80 | 80 | | | | |
| 069H~07BH | 86 | 80 | 80 | 600H~6FFH | SIMILAR TO 000H ~0FFH, SET TO "AE→CD", "51→32" "86→CD", "79→32" | | |
| 07CH · 07DH | 80 | 80 | 80 | | | | |
| 07EH~090H | 80 | 86 | 80 | 700H~7FFH | SIMILAR TO 000H ~0FFH, SET TO "AE→C0", "51→3F" "86→C0", "79→3F" | | |
| 091H · 092H | 80 | 80 | 80 | | | | |
| 093H~0A5H | 80 | 80 | 86 | | | | |
| 0A6H · 0A7H | 80 | 80 | 80 | | | | |
| 0A8H~0BAH | 79 | 79 | 79 | | | | |
| 0BBH · 0BCH | 80 | 80 | 80 | | | | |
| 0BDH~0CFH | AE | AE | 80 | | | | |
| 0D0H · 0D1H | 80 | 80 | 80 | | | | |
| 0D2H~0E4H | AE | 80 | AE | | | | |
| 0E5H · 0E6H | 80 | 80 | 80 | | | | |
| 0E7H~0F9H | 80 | AE | AE | | | | |
| 0FAH~0FFH | 80 | 80 | 80 | | | | |

FIG. 5(b)

PARA. ROM DATA

| ADDRESS | 0h ~ FFh | | | | 100h ~ 1FFh | | | | 200h ~ 2FFh | | | | 300h ~ 3FFh | | | |
|---|---|---|---|---|---|---|---|---|---|---|---|---|---|---|---|---|
| NO | 1 | 2 | 3 | 4 | 1 | 2 | 3 | 4 | 1 | 2 | 3 | 4 | 1 | 2 | 3 | 4 |
| DATA (Hsx) | AE | 51 | 86 | 79 | 93 | 6C | 85 | 7A | 8A | 75 | 84 | 7B | FF | 00 | FF | 00 |

| ADDRESS | 400h ~ 4FFh | | | | 500h ~ 5FFh | | | | 600h ~ 6FFh | | | | 700h ~ 7FFh | | | |
|---|---|---|---|---|---|---|---|---|---|---|---|---|---|---|---|---|
| NO | 1 | 2 | 3 | 4 | 1 | 2 | 3 | 4 | 1 | 2 | 3 | 4 | 1 | 2 | 3 | 4 |
| DATA (Hsx) | E2 | 1D | E2 | 1D | D9 | 26 | D9 | 26 | CD | 32 | CD | 32 | 3F | C0 | 3F | C0 |

FIG. 6(a)

| INPUT (x) | OUTPUT SURFACE (x×2-100) | OUTPUT SURFACE (x×-2+FE) | INPUT (x) | OUTPUT SURFACE (x×2-100) | OUTPUT SURFACE (x×+2-FE) |
|---|---|---|---|---|---|
| 0  | 0 (-100) | FE      | 89 | 12 | 0 (-14)  |
| 8  | 0 (-F0)  | EE      | 91 | 22 | 0 (-24)  |
| 10 | 0 (-E0)  | DE      | 9A | 34 | 0 (-36)  |
| 19 | 0 (-CE)  | CC      | A2 | 44 | 0 (-46)  |
| 21 | 0 (-BE)  | BC      | A6 | 4C | 0 (-4E)  |
| 2A | 0 (-AC)  | AA      | AB | 56 | 0 (-58)  |
| 32 | 0 (-9C)  | 9A      | B3 | 66 | 0 (-68)  |
| 3B | 0 (-8A)  | 88      | BC | 78 | 0 (-7A)  |
| 43 | 0 (-7A)  | 78      | C4 | 88 | 0 (-8A)  |
| 4C | 0 (-68)  | 66      | CD | 9A | 0 (-9C)  |
| 54 | 0 (-58)  | 56      | D5 | AA | 0 (-AC)  |
| 5D | 0 (-46)  | 44      | D9 | B2 | 0 (-B4)  |
| 65 | 0 (-36)  | 34      | DE | BC | 0 (-BE)  |
| 6E | 0 (-24)  | 22      | E6 | CC | 0 (-CE)  |
| 76 | 0 (-14)  | 12      | EF | DE | 0 (-E0)  |
| 7F | 0 (-2)   | 0       | F7 | EE | 0 (-F0)  |
| 80 | 0        | 0 (-2)  | FF | FE | 0 (-100) |

PATTERN IMAGE GENERATION DEVICE FOR IMAGE PROCESSING SYSTEM

BACKGROUND OF THE INVENTION

1. Field of the Invention

The present invention relates to a pattern image generation device for an image processing system which includes an image data conversion table and performs processings such as conversion processing, edit processing and the like on color separated image data input before outputting the image data.

2. Description of the Related Art

In a conventional digital copying machine, an analog signal obtained by reading a document is converted into multivalued digital data, the digital data is processed in its granularity, gradation property, fineness and other image quality adjustment, and then the data is recorded and reproduced by means of dot images. In particular, due to the fact that the digitally converted multivalued data is processed, the conventional digital copying machine is able not only to process the image data used to generate a highly fine and highly reproducible image but also to easily carry out various kinds of correction and editing using memory by means of the image data.

Also, in a full color digital copying machine, a document is read optically and is thus color separated to thereby produce read signals B (Blue), G (Green) and R (Red); and, the read signals B (Blue), G (Green) and R are corrected and converted into the record signals Y (Yellow), M (Magenta) and C (Cyanogen) of color materials such as a toner, ink, an ink doner film and the like. Basically, dot images respectively obtained from the respective color materials are output in such a manner that they are superimposed on one another, thereby reproducing a full color document. In this case, images obtained from color materials equal in amount to one another provides an achromatic color and, therefore, actually, an under color removal (UCR) processing is performed to thereby remove the record signals Y, M and C corresponding to the color materials equal in amount so as to avoid the useless consumption of the color materials. However, if the UCR processing is performed, then the amounts of the color materials used are decreased to thereby reduce the depth or graveness of the color, so that mass of the whole color image becomes insufficient. Also, due to the fact that reproduction of grey or black is contrary to reproduction of a highly chromatic color, a simple UCR processing is not able to enhance the reproducibility of the color sufficiently. In order to make up for such massive shortage in the chromatic colors or in order to execute a grey output, black or India ink (K) is generated according to the amount of the color material to be UCR processed. Now, an example of conventional digital color image forming device which is disclosed in Published Unexamined Japanese Patent Application No. Hei-2-70173, will be described hereinafter briefly.

In FIG. 8, there is shown a block diagram of the structure of a digital color image forming device.

In FIG. 8, IIT (image input terminal) 100 is used to read a document by use of a CCD line sensor and color separate the document into read signals B, G and R and also to convert the read signals B, G and R into digital image data. IOT (image output terminal) 115 is used to expose and develop by use of a laser beam and reproduce a color image. Parts interposed between IIT 100 and IOT 115 and including an END conversion module 101 to an IOT interface 110 cooperate in constituting an image data edit processing system (IPS: image processing system). The IPS converts the read signals B, G and R into the toner record signals Y, M, C, and K, and selects and outputs every develop cycle the record signal that corresponds to the develop color. What is important here is, in converting the read signals (B, G and R signals) into the record signals (Y, M, C and K signals), how the balance of the color is adjusted, how the color is reproduced in accordance with the reading characteristics of the IIT and the output characteristics of the IOT, how the balance of the density or contrast of the color is adjusted, how the edge is emphasized or how unsharpness or moire is adjusted, and the like.

IIT 100 takes in 1 pixel in a size of 16 dots/mm with respect to each of the read signals B, G and R by use of a CCD sensor, and outputs the data in 24 bits (3 colors ×8 bits; 256 gradations). The CCD sensor includes B, G and R filters mounted to the upper surface thereof, has a density of 15 dots/mm and a length of 300 mm, and scans 16 line/mm at a process speed of 190.5 mm/sec. Thus, the CCD outputs the read signals at a speed of 15 M pixels per sec. substantially for the respective colors. And, IIT 100, by means of logarithmic conversion of analog signals of the pixels of B, G and R, converts the information of reflectance into the information of density and further into digital signals.

The IPS is a system which is used to input therein the read signals B, G and R from IIT 100, performs various kinds of data processings on the read signals in order to enhance the reproducibility of color, gradation, fineness and the like, selects the record signal of a develop process color from the record signals Y, M, C and K, converts the selected record signal into an on/off signal, and outputs the on/off signal to IOT 115. As shown in FIG. 8, the IPS includes an END conversion (Equivalent Neutral Density conversion) module 101 which adjusts (converts) the record signal into a grey balanced color signal; a color masking module 102 which matrix operates the read signals B, G and R to thereby convert the read signals into the record signals that correspond to the toner amounts of Y, M and C; a document size detection module 103 which detects a document size in pre-scanning and erases (erases the frame of) a platen color in document read scanning; a color conversion module 104 which converts a color specified in a given area in accordance with an area signal input from an area image control module; a UCR processing & black generation module 105 which generates K in a proper amount in order to prevent a color from being made impure and decreases Y, M and C equally in amounts according to the amount of K generated and also which performs a UCR processing on the K signals as well as the record signals Y, M and C in accordance with signals in a mono-color mode and a full color mode and gates the signals that are obtained after such UCR processing; a space filter 106 having a function to recover an unsharp color and a function to remove a moire; a TRC (Tone Reproduction Control) module 107 which performs a density adjustment, a contrast adjustment, a negative-positive reversal, color balance adjustment and other similar processings in order to improve reproducibility; a reduction and enlargement processing module 108 which performs a reduction and enlargement processing in a main scanning direction; a screen generator 109 which converts a gradation toner signal of a process color into a binary on/off toner signal and outputs the binary on/off toner signal; an IOT interface module 110, an area image control module 111 which includes an area generation circuit and a switch matrix; an edit control module which includes an area command memory 112, a color palette video switch circuit 113, a font buffer 114 and the like; and other similar modules.

As described above, in the digital color image forming device which performs various processings such as correction, conversion, editing and other processings on the image data in a multi-stage manner, there is used a pattern generator PG so as to evaluate the reproducibility, fineness and so on of color image as well as to carry out adjustments and trouble shootings. For example, by using a lattice pattern, mis-registration for each of colors can be observed longitudinally and transversely, if any. Also, the reproducibility of Japanese, especially, kanji (Chinese) character can be observed by means of oblique lines and use of longitudinal and transverse patterns permits observation of poor transfer and gradation reproducibility. The pattern generator PG which generates such constant patterns is normally included within the digital color image forming device and, for example, as a table conversion device for converting signals, there is also used an LUT using a RAM.

In the above-mentioned pattern generator, patterns vary according to the applications of the pattern generator and, therefore, there must be prepared the patterns that correspond to the applications thereof. In order words, it is difficult that a generator is specially provided for generation of pasterns and further various patterns are provided easily.

SUMMARY OF THE INVENTION

The present invention is accomplished to eliminate the drawbacks accompanying the above-mentioned conventional digital color image forming device. Accordingly, it is an object of the invention to provide a pattern image generation device for an image processing system which is able to generate various patterns by use of a RAM for processing ordinary image data.

It is another object of the invention to provide a pattern image generation device which is able to generate patterns with a simple structure.

In order to attain the above objects, according to the invention, there is provided a color image processing device which performs conversion, editing and other processings on input image data, converts the input image data from color separation signals into color material signals, and then outputs the color material signals. The color image processing device comprising: control means for setting at least conversion data and processing parameters and for controlling the whole device; and image data conversion means having conversion data to be set according to the processing purposes for performing a conversion processing on the image data by use of the conversion data, wherein data for generation of patterns is set in the image data conversion means to thereby generate the patterns.

A pattern image generation device for a color image processing system includes an image conversion processing means for converting an input image data signal to output a converted image data, the image conversion processing means including rewritable memory means and address control means for controlling a memory address of the memory means and an operation processing means for controlling the operation of the image conversion processing means, the address control means including a variable address generation means for generating a variable address signal in accordance with a synchronizing signal output from the operation processing means, and a signal select means for selecting one of said input image data signal, an address signal output from said operation processing means and the variable address signal in accordance with a control signal from the operation processing means, and wherein the operation processing means outputs to the memory means one of conversion data used to convert the input image data signal to be set in the memory means and predetermined pattern generation data to be set in the memory means in synchronization with the control signal, and the operation processing means controls the signal select means to select one of the input image data signal and the variable address signal.

The pattern image generation device for a color image processing system according to the invention comprises control means for setting conversion data and processing parameters and also for controlling the whole device, and image data conversion means having conversion data to be set according to processing purposes for converting the image data by use of the conversion data, wherein the device sets data for pattern generation in the image data conversion means to thereby generate patterns. Due to this, the present pattern image generation device is able to generate shooting patterns simply by setting the pattern generation data in the conversion table and adding the address generation means without arranging a special pattern generator. Also, the address generation means is used to count synchronous signals to generate the addresses of the conversion table, and the control means is used to set the data of the conversion table and also to switch the addresses of the conversion table from the image data into the output of the address generation means to thereby generate patterns. Thanks to this, the present pattern image generation device is able to easily change the patterns to be generated by changing the count modes without changing the data of the conversion table.

BRIEF DESCRIPTION OF THE INVENTION

The accompanying drawings, which are incorporated in and constitute a part of the specification, illustrated presently preferred embodiments of the invention and, together with the general description given above and the detailed description of the preferred embodiments given below, serve to explain the principles of the invention. In the accompanying drawings:

FIGS. 1(a) and 1(b) are block diagrams of an embodiment of a pattern image generation device for a color image processing system according to the invention;

FIGS. 2(a), 2(b), 2(c), 2(d), 2(e) are charts of an embodiment of a count mode of an address generation counter;

FIGS. 3(a) and 3(b) are block diagrams of an embodiment of the structure of a signal processing system employed in the image processing system;

FIG. 4 is a schematic view of the mechanism of the image processing system;

FIGS. 5(a), 5(b), 5(c), 5(d) are an explanatory view of an embodiment in which data is set into RAM;

FIGS. 6(a), 6(b), 6(c) are an explanatory view of an embodiment in which patterns are generated by use of a matrix conversion circuit;

FIG. 7 is a block diagram of an embodiment in which pattern generation and taking-in of trouble shooting data are both possible; and, FIG. 8 is a block diagram of the structure of a digital color image forming system.

DESCRIPTION OF THE PREFERRED EMBODIMENTS

Description will be given below of an embodiment of a pattern image generation device according to the invention with reference to the accompanying drawings.

Figure 1A:
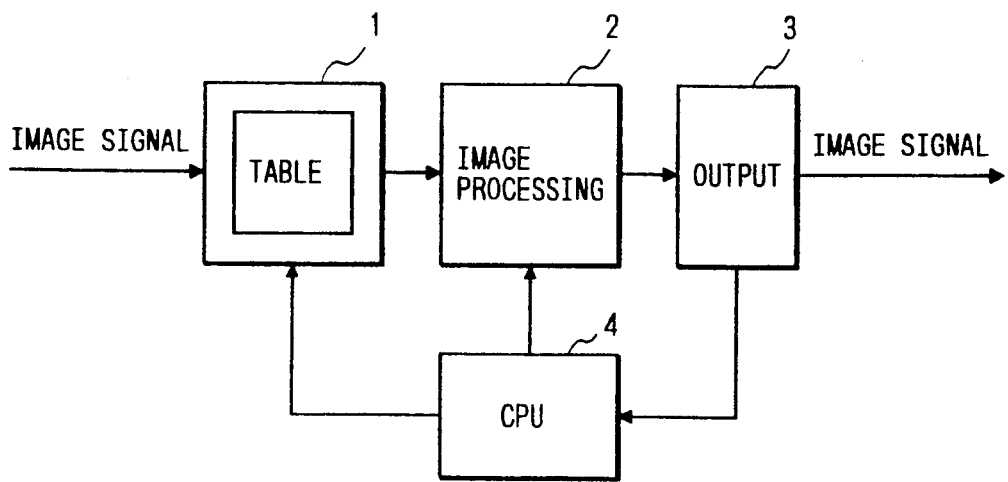

In FIG. 1, there is shown a block diagram of a pattern image generation device for a color image processing system according to the invention.

Referring now to FIG. 1, an image data conversion processing part 1 is used to perform a necessary processing on the image data that is input from a document read device by use of a conversion table. As the image data conversion processing part 1, for example, there is used an ENL (END) which ENL (Equivalent Neutral Lightness) converts the input image data of B, G and R, or a matrix which color converts the input image data into Lab. An image processing part 2 is used to perform various processings, which include an editing processing, a color conversion processing, a color adjustment processing and the like, on the image data. An output conversion processing part 3 uses a conversion table to perform a conversion processing to be output to a printer. For example, the output conversion processing part 3 is a matrix or a TRC which converts the image data into the color material signals of Y, M and C. A control part 4 is, for example, a CPU (Central Processing Unit) which calculates parameters according to operation modes, writes the image data into the conversion table in the image data conversion processing part 1 or output conversion processing part 3, and also controls the image processing part 2 according to the editing contents of editing, color conversion, color adjustment and the like.

Figure 1B:
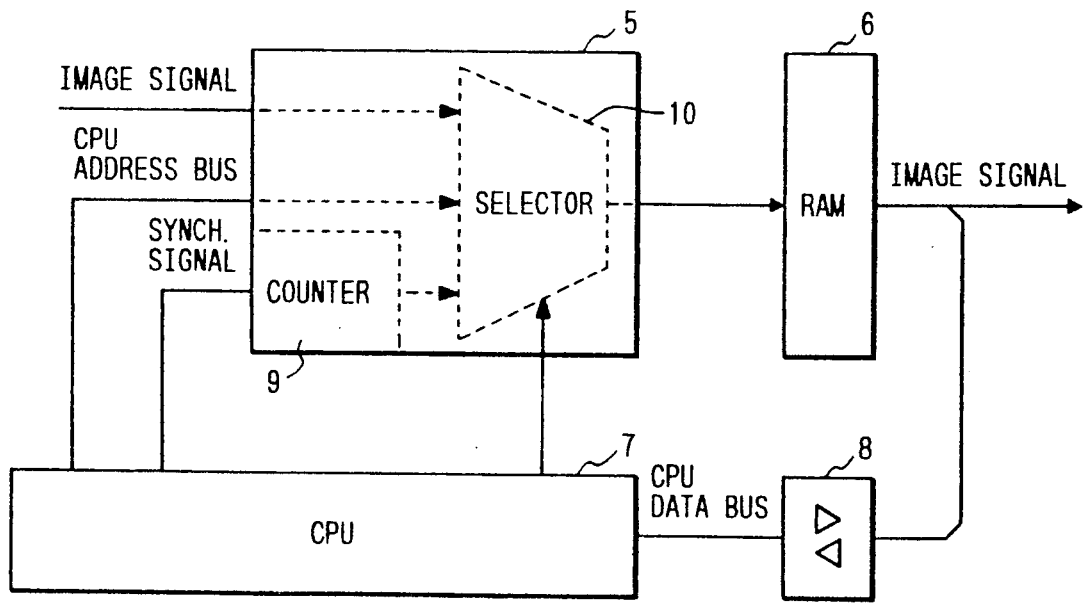

In FIG. 1(b), there is shown a block diagram of a detailed structure of the image data conversion part 1, which includes an address control circuit 5 comprising an address generation counter 9 and a selector 10, and a RAM 6 to be used as a conversion table. The address control circuit 6, using the image data, a CPU address bus and a synchronous signal as inputs, allows the address generation counter to count the synchronous signals in a given count mode to thereby generate an address, and allows the selector 10 to select one of the image data, the CPU address and the address of the generation counter 9. For this purpose, a CPU 7 controls the count modes of the address generation counter 9 of the address control circuit 5 according to the operation modes, controls the selector 10, controls the read/write mode of the RAM 6, and generates the write data of the RAM 6.

In normal operation, at first, the CPU 7 calculates and generates conversion data which are used to ENL convert the B, G and R signals read by the document read device or to color convert the same signals into Lab, and sends out the conversion data to a CPU data bus. At the same time, the CPU 7 generates the write address of the RAM 6 and sends out the write address to a CPU address bus. And, the CPU 7 switches the RAM 6 into the write mode and controls the selector 10 of the address control circuit 5 to select the CPU address bus. As a result, the conversion data for normal image data processing is set in the RAM 6. Then, if the CPU 7 switches the RAM 8 into the read-out mode and controls the selector 10 of the address control circuit 5 to select the image data, then the conversion data can be read out from the RAM 6 with the image data input from the document read device as the address.

When generating pasterns for the purpose of trouble shooting and the like, at first, the CPU 7 generates the conversion data for pattern generation and sends the conversion data to the CPU data bus and at the same time the CPU 7 generates the write address of the RAM 6 and sends the write address to the CPU address bus. And, the CPU switches the RAM 6 into the write mode and controls the selector 10 of the address control circuit 5 to select the CPU address bus. Consequently, there is set the conversion data for pattern generation in the RAM 6.

Next, if the CPU 7 switches the RAM 6 over to the read out mode and controls the address generation counter 9 to be set into the count mode that corresponds to the patterns to be generated and at the same time controls the selector 10 to select the output of the address generation counter 9, then the conversion data is read out from the RAM 6 in accordance with the address generated by the address generation counter 9 so that desired pattern image data can be output.

Referring now to FIG. 2, there is shown a graphical representation of examples of a count mode of the address generation counter. Specifically, FIG. 2(a) shows a basic mode used to increment an address every video clock, FIG. 2(b) shows a mode used to increment the address every line by means of a line synchronous signal, FIG. 2(c) shows a mode used to increment the address in a block, FIG. 2(d) shows a mode used to make a repetitive address identical in a plurality of lines, and FIG. 2(e) shows a mode used to shift the repetitive address every line.

Figure 2A:
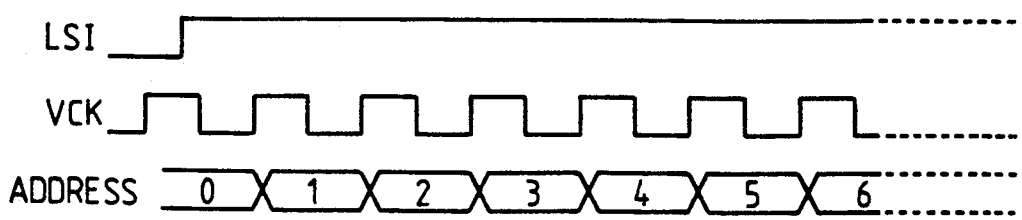
Figure 2B:
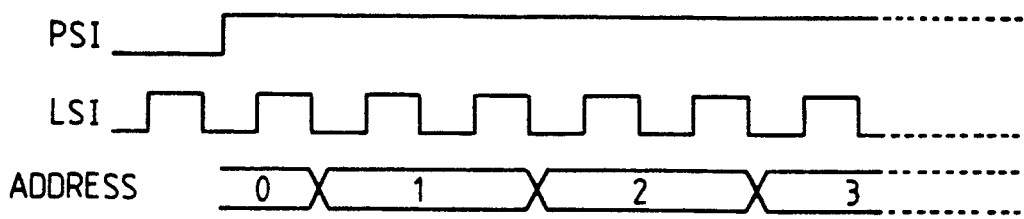

In the mode shown in FIG. 2(a), by setting the conversion data of the RAM or by controlling the address to be incremented, there can be generated a pattern which varies in the longitudinal, transverse and oblique directions thereof, while in the mode of FIG. 2(b) only the striped pattern can be generated because 2 lines have the same conversion data. However, even in the mode of FIG. 2(b) naturally, the roughness (width) of the striped pattern can be controlled by setting the conversion data of the RAM or by controlling the address to be incremented. Even when the B, G and R data, for example, are set as the conversion data of the RAM, the B, G and R data can be arranged in carious manners to thereby vary the pattern, for example, the data can be set for every two addresses and then can be set with a double width.

Figure 2C:
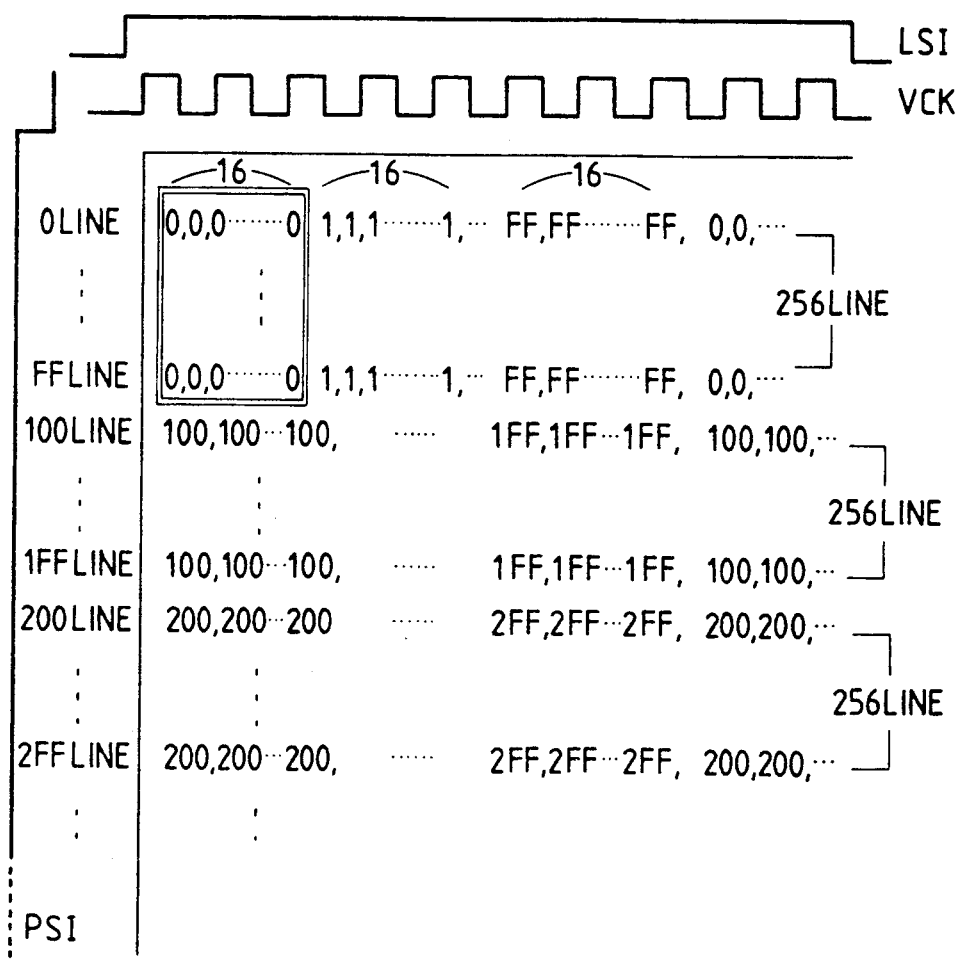

The mode shown in FIG. 2(c) is a mode in which the same address block is arranged with a give width in the main and sub scanning directions thereof respectively. In the illustrated embodiment, for each line, the address is updated every 16 pixels and the updating is repeated with a width of 256 (0-$FF_H$) pixels, so that same address pattern can be obtained every 256 lines; for example, from 0 line to $FF_H$ line, from $100_H$ line to 1 $FF_H$ line, from $200_H$ to 2 $FF_H$ line, - - - - - -.

According to this mode, with a block of 16×256 pixels as a minimum unit, lattice-shaped, mesh-shaped or island-shaped patterns can be generated with ease. For example, by setting the same color in the addresses 0 to $FF_H$, $100_H$ to 1 $FF_H$, - - - - - - with the gradations thereof differing from one another, the reproducibility, color shift and the like of the respective colors can be observed. However, it should be naturally understood that a plurality of blocks can be collected together in a macro block or the size of the block in the main scanning direction can be made different from that in the sub scanning direction. That is, the size of the unit to form the pattern can be adjusted by varying the size to update the address, or by changing the arrangement of the addresses to set the same data.

The mode shown in FIG. 2(b) is a mode in which a block of addresses are repeated in the main scanning direction with a given pixel width and a different piece of information can be inserted every given width. In the illustrated embodiment, for each line, the addresses are repetitively incremented in 0-1 $FF_H$ and a line to be repeated in $200_H$ i-3 $FF_H$ is inserted at the 7 $E_H$-th line and 7 $F_H$-th line.

Figure 2D:
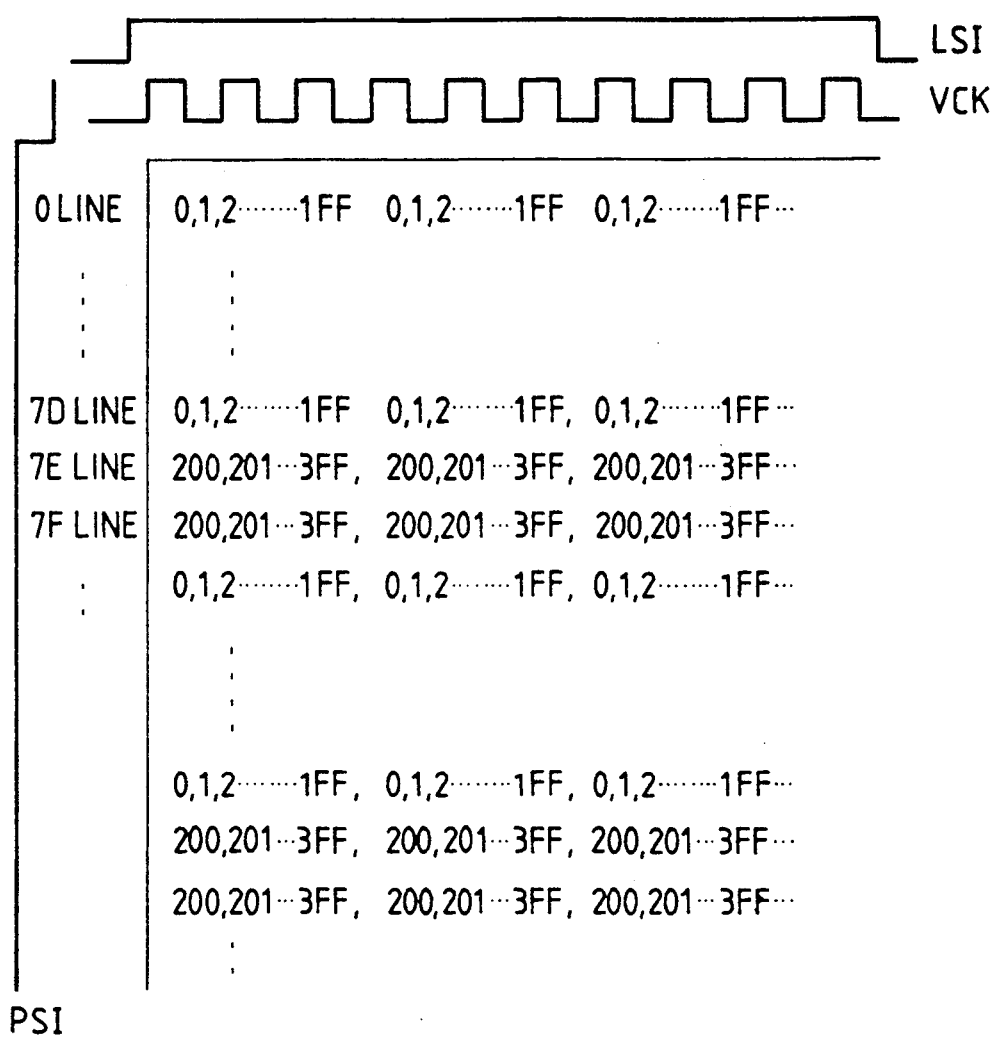

According to the mode of FIG. 2(d), a horizontal line can be inserted at the 7 $E_H$-th and 7 $F_H$-th lines and a pattern with vertical lines inserted repeatedly between the horizontal lines can be generated. Of course, if the same data is set, for example, in the addresses 0, $1_H$, $2_H$ and $200_H$, $201_H$, $202_H$, then there can be generated a vertical line which extends down to the bottom. And, the thickness of the vertical line can be changed depending on whether the addresses, in which the same data is set, are specified as 0 and $1_H$ or as $0-3_H$.

The mode shown in FIG. 2(e) is a mode in which, similarly as in the mode shown in FIG. 2(d), the addresses are repeated in the main scanning direction with a given pixel width and the addresses are shifted in the sub scanning direction. In the illustrated embodiment, the leading addresses of the respective lines are carried up one by one. According to the present mode, an obliquely striped pattern can be generated and also, if the leading addresses of the respective lines are carried up one by one and then they are brought down reversely, then a zig-zag pattern can be generated as well.

Next, there are shown views of the structures of an image processing system to which the above-mentioned present invention is applied. In FIG. 3, there is shown a block diagram of the structure of a signal processing system of the image processing system. FIG. 4 is a schematic diagram showing the structure of the mechanism of the image processing system.

In FIG. 3, an image input part 100 is an IIT which includes a reduced type sensor comprising three B, G, and R CCD line sensors respectively disposed, for example, at right angels to the sub scanning direction and which moves in the sub scanning direction at a speed corresponding to a reduction or enlargement magnification and scans in the main scanning direction in synchronization with a timing signal from a timing generation circuit 12 to read an image. In the image input part 100, analog image data is converted into gradation exposed digital image data, for example, of 8 bits. A shading correction circuit 11 shading corrects the digital image data with respect to the variations thereof between the respective pixels due to various factors, and a gap correction circuit 13 corrects the gap of the image data between the respective line sensors. The reason why the gap correction is made is that the read image data is delayed by a FIFO 14 a time corresponding to the gap of the CCD line sensor so that the B, G and R image data at the same position can be obtained at the same time. An ENL (Equivalent Neutral Lightness) conversion circuit 15 is used to perform a grey balance processing on the image data by use of parameters corresponding to the types of a document. Also, the ENL conversion circuit 15, in accordance with a negative-positive reversal signal from an edit processing part 400 to be described later, reverses the way of treating grey every pixel to thereby reverses the negative and positive sides of the image data to each other, for example, it is able to carry out the negative-positive reversal only a certain specified area.

The B, G and R image data processed by the ENL conversion circuit 15 are converted by a matrix circuit 16a into, for example, color space signals $L^*$, $a^*$, and $b^*$, respectively. In the color space signals $L^*$, $a^*$ and $b^*$, in a coordinate axis at which they intersect each other at right angles, $L^*$ represents brightness, and $a^*$ and $b^*$ respectively represent chromaticity planes (hue, chroma). Such conversion into the color space signals $L^*$, $a^*$ and $b^*$ makes it easy to interface with an external device such as a computer and the like by means of a memory system 200 and facilitates the execution of the color conversion and editing processing, and detection of the image information. A selector 17 is used to selectively take out the image data from the output of the matrix conversion circuit 16a or from the memory system 200, which is an interface with the external device, or is used to take in the image data from both of them to thereby perform a texture synthesization or a transparency synthesization. For this purpose, the selector 17 has a function to perform a synthesization rate setting processing, an operation processing and a synthesization processing.

An under density detection circuit 18 is used to make out a histogram of a document density by means of prescanning to thereby detect an under density and to jump over pixels less than the under density so as to be able to improve the quality of a copy of a foggy document such as a newspaper and the like. A document detect circuit 19 is used to detect a boundary between the back surface of a black platen and a document to thereby obtain a circumscribed rectangle so as to detect and store the size of the document. In the under density detection circuit 18 and document detect circuit 19, there is used the brightness information signal $L^*$ out of the color space signals $L^*$, $a^*$, and $b^*$.

An edit processing part 400 is used to perform an edit processing and set an area command for switching parameters and the like for every area, to generate an area control signal in accordance with the area command, and to perform color editing, color conversion, marker color detection and other processings on the image data. And, the thus processed image data are then input to the matrix conversion circuit 16b and a picture character separation circuit (TIS circuit) 20.

With respect the image data that is edit processed, in he matrix conversion circuit 16b, the signals $L^*$, $a^*$, and $b^*$ are converted into the Y, M, and C toner colors and, in the picture character separation circuit 20, a plurality of pixels are blocked to thereby identify an area for a color character/a black character/a pattern (character/medium contrast). An under density detection circuit 21 is used to generate an Indian ink plate (K) according to a mono color/full color signal from the image data of Y, M and C toner colors converted by a matrix conversion circuit 16b, removes the Y, M and C toner colors in an equal amount, outputs the image data of a process color, and makes a hue judgement to thereby generate a hue signal. Here, it should be noted that, in the identification processing by the picture character separation circuit 20, there is produced a delay of, for example, 12 lines in the area identification signal due to blocking and, FIFOs 22a and 22b are used to time the hue signal and image data to be synchronous with such delay.

A reduction and enlargement circuit 23b is used to reduce and enlarge the image data in accordance with a specified magnification rate. Here, the reduction and enlargement circuit 23b performs thinning-out and interpolation processings on the image data in the main scanning direction. This is because the image data in the sub scanning direction is contracted and expanded in the image input part 100 by changing the scanning speed in accordance with the magnification rate. Another reduction and enlargement circuit 23a is used to contract and expand the area command to prevent the execution area of area control information from shifting out of place according to the reduction and enlargement of the image data. The area control information that is reduction and enlargement processed is then decoded by an area decoder 24 and is supplied to the respective processing blocks. The area decoder 24 is used to generate the parameters of a filter 25, coefficients of a multiplier 26, and parameter switching signal of a TRC circuit 27 from the area command, area identification signal and hue signal, and also to distribute them.

The filter 25 is used to perform intermediate tone moire removal and character edge emphasis processings according to spatial frequencies on the image data that is contracted or expanded by the reduction and enlargement circuit 23b. The TRC circuit 27 is used to adjust the density of the image data according to the characteristics of the IOT by use of a conversion table, and a PAL 29 is used to switch the parameters of the conversion table of the TRC circuit in accordance with a signal of a development process or area identification. The multiplier 26 is used to perform an operation of a x+b on image data x by use of coefficients a and b. In the multiplier 26, the coefficients are switched in such a manner that the operation is omitted for the intermediate tone and the coefficients become γ for the character. And, by using the multiplier 26 in combination with the TRC circuit 27 and by properly selecting the coefficients with respect to the respective color components and the conversion table, data resetting, color adjustment and density adjustment with respect to the color character, black character and pattern can be executed. Also, the parameters of the filter 25 can be standardized and the character edge emphasis can be adjusted by means of the coefficients a and b. The thus adjusted image data is stored in the memory system or dot developed by a screen generation part 28 of a ROS 300 so that it is output in the form of a dot image.

The edit processing part 400 is used to perform a color conversion processing and a color edit processing as well as to generate an area control signal. To the edit processing part 400, there are input the image data L*, a*, and b* from the selector 17. And, in order to facilitate the detection, editing and conversion of colors such as a marker color and other colors, in an LUT 415a, the chromaticity information is converted from a, b of a system of rectangular coordinates to C, H of a system of polar coordinates. A color conversion & pallet 413 includes color to be used, for example, in the color conversion and color editing in 32 kinds of pallets and, in accordance with an area command input through a delay circuit 411a, performs processings such as detection, editing, conversion and other processings of marker colors on the image data L, C, and H. And, only the image data in an area allowing the color conversion and the like to be performed are processed in the color conversion & pallet 413 and are inversely converted from C, H to a, b in an LUT 415b. After then, the image data in other areas are output directly from a selector 416 and are transmitted to the above-mentioned matrix conversion circuit 16b.

The marker colors (three colors) detected from the image data by the color conversion & pallet 413 and a 4-bit signal in a closed area are sent to a density conversion/area generation circuit 405. The density conversion/area generation circuit 405 performs a binary processing, in which [1] is selected if there are present a given number of black pixels or more in 16 pixels, with a window of 4×4 by use of FIFOs 410a, 410b and 410c. That is, in the circuit 405, the density is converted from 400 spi into 100 spi. The thus generated marker signal (a closed loop or a marker dot) is written through a DRAM controller 402 into a plane memory 403 by the density conversion/area generation circuit 405.

Also, with respect to the marker dot signal, in order to eliminate the possibility that tiny dust can be detected in error as a marker, a time corresponding to three lines is delayed by a FIFO 408 to provide a window of 3×3 and the marker dot is detected and the values of the coordinates thereof are generated by a coordinates values generation circuit 407 before the marker dot is stored in a RAM 406. Although the marker dot is also stored in the plane memory 403, the above-mentioned processing is performed in order to prevent wrong detection of the marker dot.

The plane memory 403 is a memory which is used to store an area command to execute color conversion, color editing and other area editing processings. For example, the plane memory 403 allows an edit pad to specify an area and is able to write the area command into the thus specified area. In other words, the area command in the area specified by the edit pad is transferred through a CPU bus to a graphic controller 401, from which graphic controller 401 it is further written through the DRAM controller 402 into the plane memory 403. The plane memory 403 consists of four surfaces and is able to set 16 kinds of area commands ranging from 0 to 15.

Figure 3A:
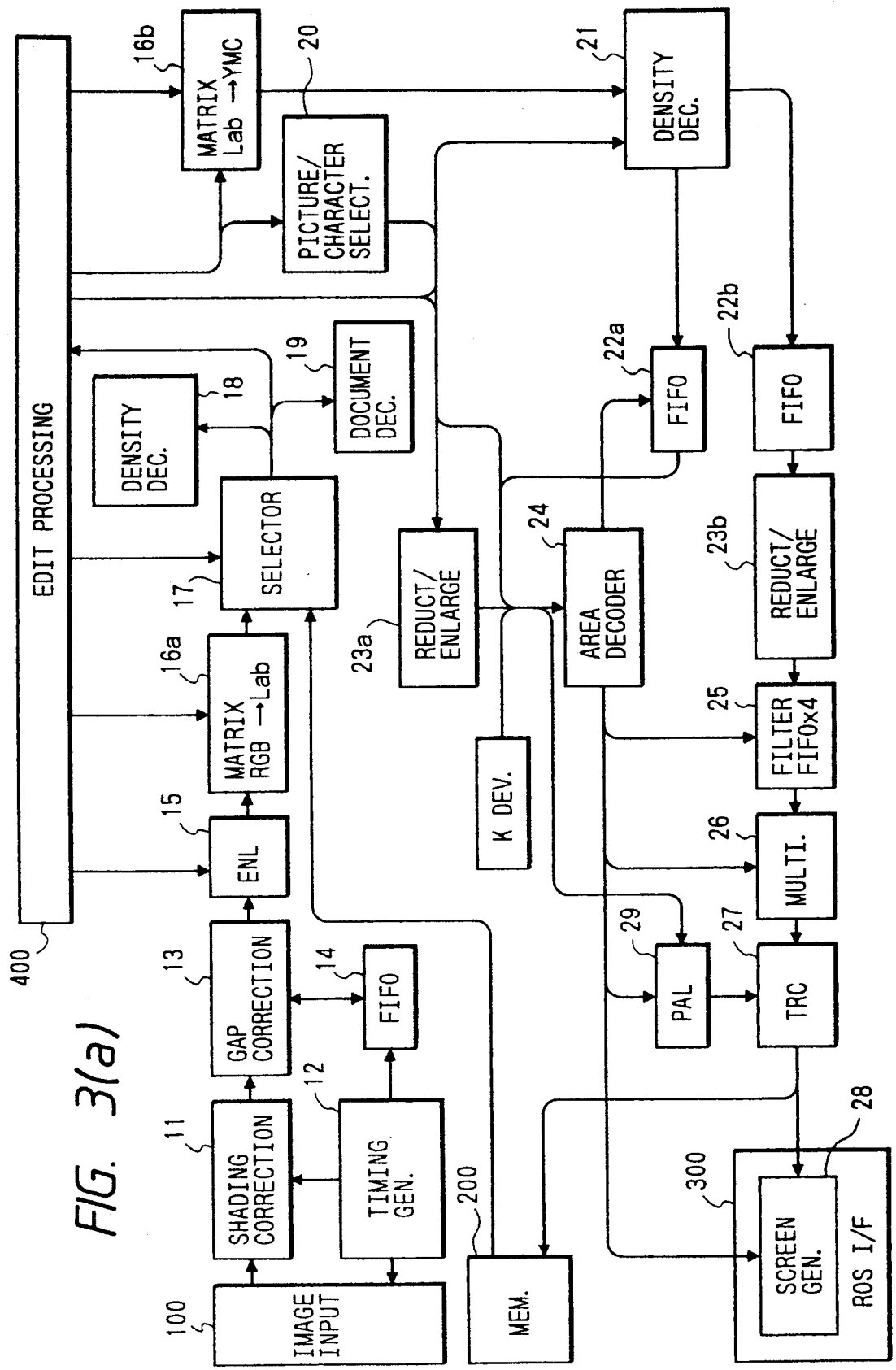
Figure 3B:
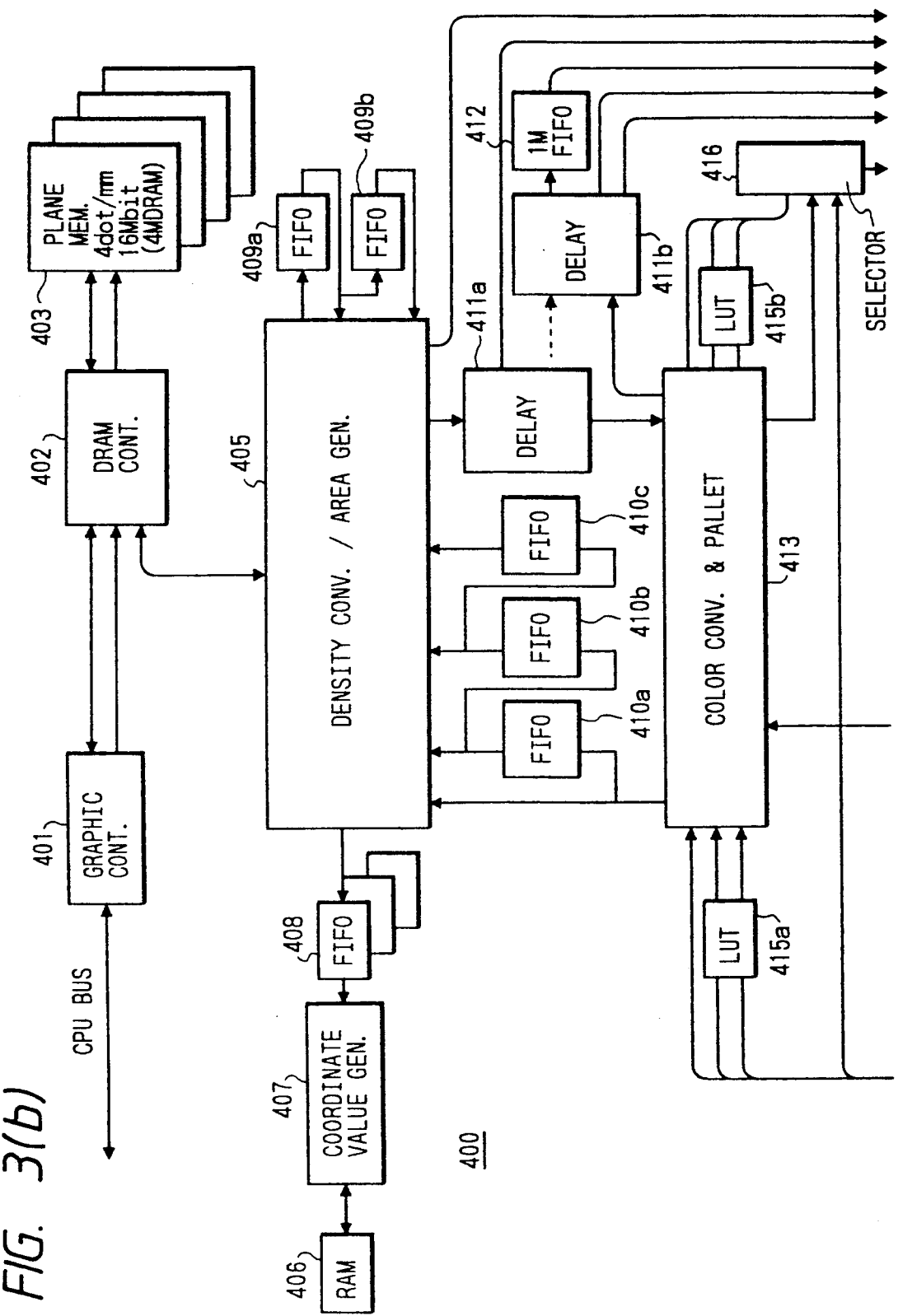
Figure 4:
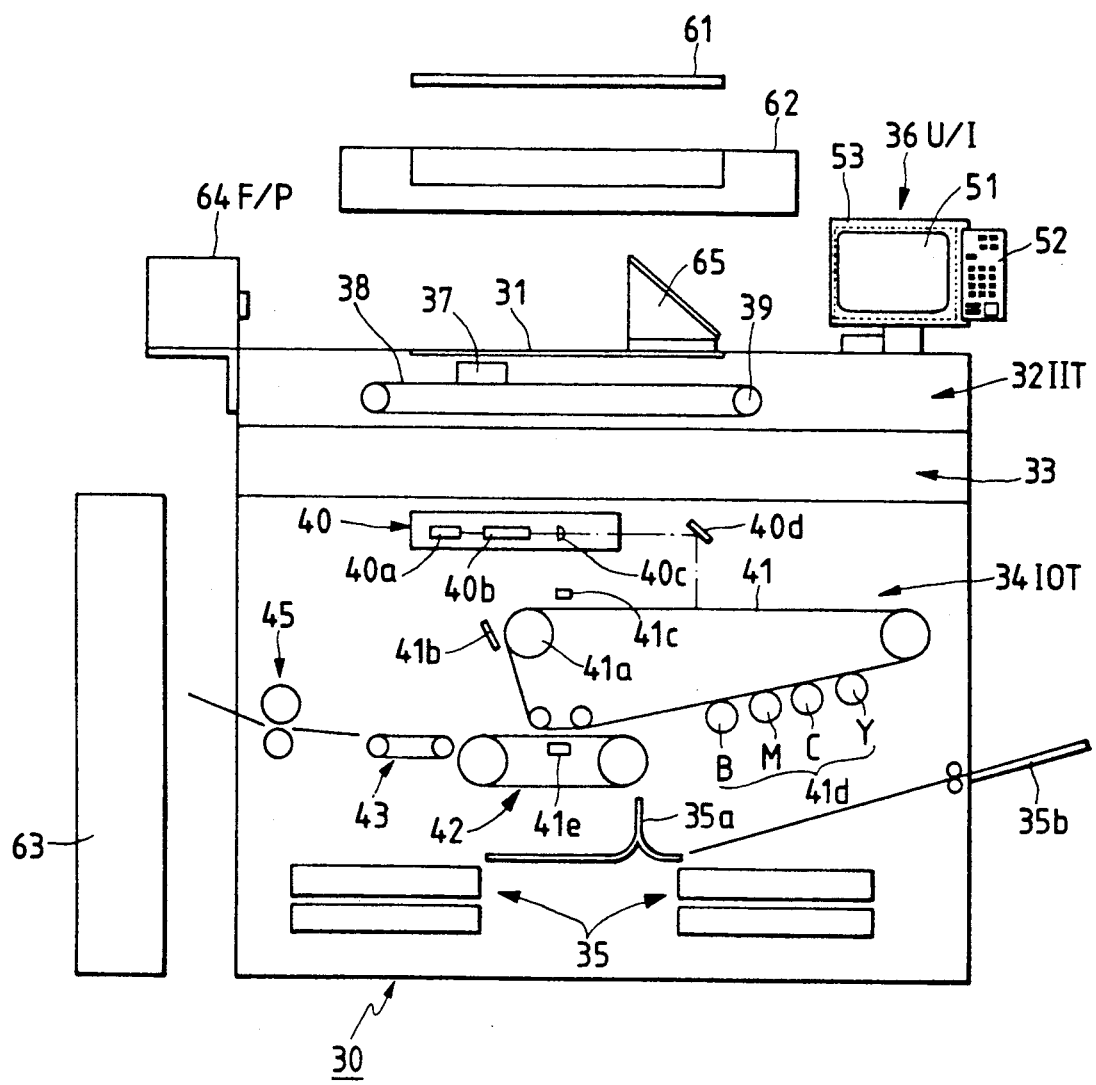

The area command of 4 bits stored in the plane memory 403 is read out in synchronization with the output of the image data and is used to switch the parameters and the like of the filter 25, multiplier 26, TRC circuit 27, screen generation part 28 and the like through the image data processing system, ENL conversion circuit 15, matrix conversion circuit 16, selector 17, under density detection circuit 21 and area decoder 24 respectively shown in FIG. 3(a). When the area command is read out from the plane memory 403 and is used to perform the edit processing in the color conversion & pallet 413 and to switch the parameters in he image data processing system, the density conversion from 100 spi to 400 spi is necessary and such density processing is performed by the density conversion/area generation circuit 405. In the density conversion/area generation circuit 405, FIFOs 409a and 409b are used to provide a block of 3×3 and data interpolation is carried out in accordance with the block pattern, whereby the density is converted from 100 spi to 400 spi so as to prevent the corrugated boundaries of a closed loop curve, edit area ad the like. Delay circuits 411a, 411b, IMFIFO 412 and the like are used to adjust a timing between the area command and image data.

Referring now to a color copying machine shown in FIG. 4, a base machine 30 includes a platen glass 31 which carries a document on the upper surface thereof, an image input terminal (IIT) 32, an electric system control storage part 33, an image output terminal (IOT) 34, a paper tray 35, and a user interface (U/I) 36. The base machine 30, as optional equipment, can include a film image read device which comprises an edit pad 61, an auto document feeder (ADF) 62, a sorter 63, a film projector (F/P) 64 and a mirror unit (M/U) 65.

The image input terminal 32 comprises an imaging unit 37, a wire 38 and a drive pulley 39 respectively for driving the imaging unit 37. The image input terminal 32 uses a color filter provided in the imaging unit 37 to color separate the image information of a color document into the light primary colors B (blue), G (green) and R (red), then uses a CCD line sensor to read the thus color separated color document image information, converts the color document image information into digital image data BGR of multiple gradations, and outputs the digital image data BGR to an image processing system. The image processing system is stored in the electric system control storage part 33 and is adapted such that it inputs the digital image data BGR and preforms various processings such as conversion, correction, editing and other processing on the digital image data BGR in order to improve the color, gradation, fineness, picture quality and reproducibility thereof. The image processing system also converts the digital image data BGR into the toner primary colors Y (yellow), M (magenta), C (cyanogen) and K (black), converts the gradation toner signal of a process color into an on/off binary toner signal, and outputs the on/off binary toner signal to the image output terminal 34. The image output terminal 34 includes a scanner 40 and a sensitive belt 41, converts the image data into an optical signal in a laser output part 40a, forms a latent image corresponding to the document image on the photosensitive belt 41 through a polygonal mirror 40b, F/θ lens 40c and a reflecting mirror 40d, transfers the image to a sheet of paper delivered from the paper tray 35, and discharges a color copy.

Referring to the image output terminal 34, the sensitive belt 41 is driven by a drive pulley 41a and in the periphery of the belt there are disposed a cleaner 41b, a charged member 41c, Y M C and K developing members 41d, and a transfer member 41e. A transfer device 42 is located opposed to the transfer member 41e. A sheet of paper being fed from the paper tray 35 through a paper feed path 35a is to be held between the belt 41 and the transfer device 42. If a four full color copy is required, then the transfer device 42 is rotated four times to transfer the Y M C and K latent images to the paper and, after then, the paper is fad from the transfer device 42 through a vacuum feed device 43 to a fixing device 45. Then, the paper is fixed by the fixing device 45 and is then discharged as a four full color copy. An SSI (signal sheet inserter) 35b is used to allow the paper to be supplied selectively by hand to the paper feed path 35a.

A user interface 36 is a device through which a user can select a desired function and instruct the execution condition thereof. The user interface 36 includes a color display 51 and a hard control panel 52 and, when an infra-red touch board 53 is combined therewith, then the user is able to give instructions directly by use of soft buttons provided on the screen of the touch board 53.

The electric system control storage part 33 is used to store a plurality of control substrates, which are constructed separately from one another in the respective processing units such as the above-mentioned image input terminal 32, image output terminal 34, user interface 36, image processing system, film projector 64 and the like, to store an MCB (machine control board) substrate for controlling the operations of the image output terminal 34, automatic document feed device 62, sorter 63 and the like, and to store an SYS substrate for controlling the whole of these parts.

Also, in a conventional pattern generator, since the image processing block is made plain, Y M and C can be output but pure K (pure black) and process black mixedly including Y M C cannot be output simultaneously. According to the invention, however, by setting the set data of the RAM and the matrix coefficients, both Y M C and pure black can be output. Description will be given below of an embodiment of the invention which permits output of YMC as well as pure black.

Figure 5C:
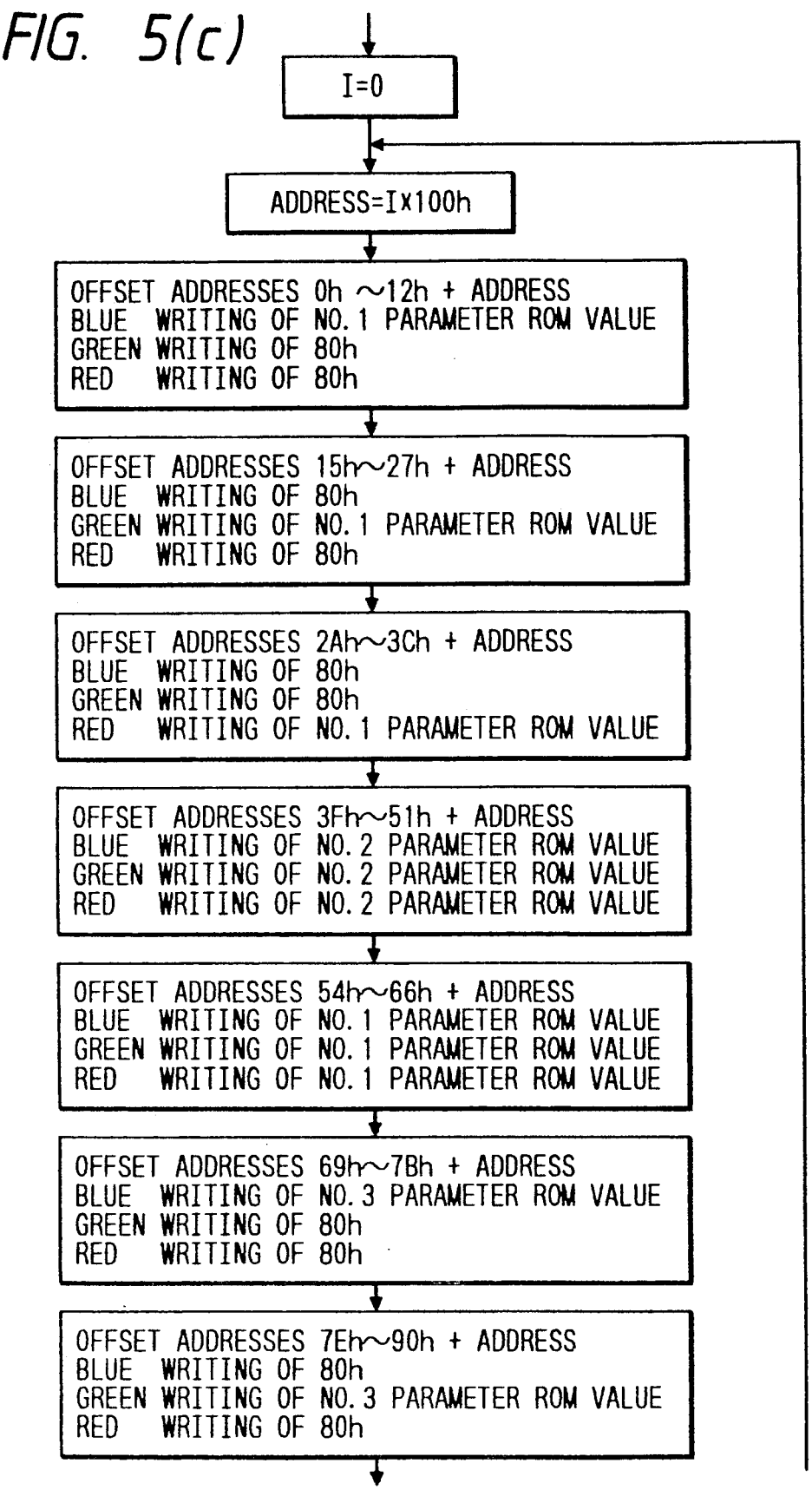
Figure 5D:
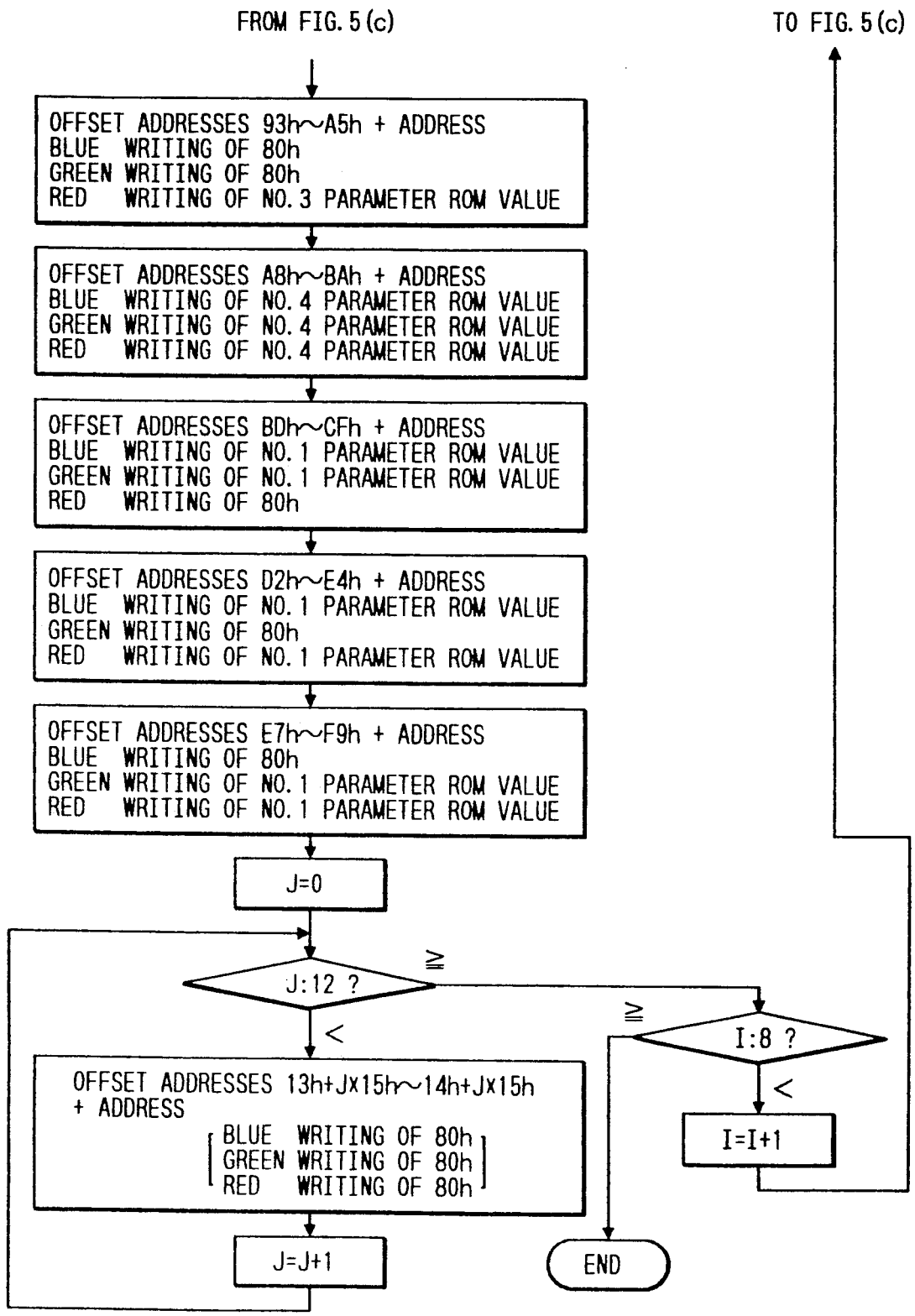
Figure 6B:
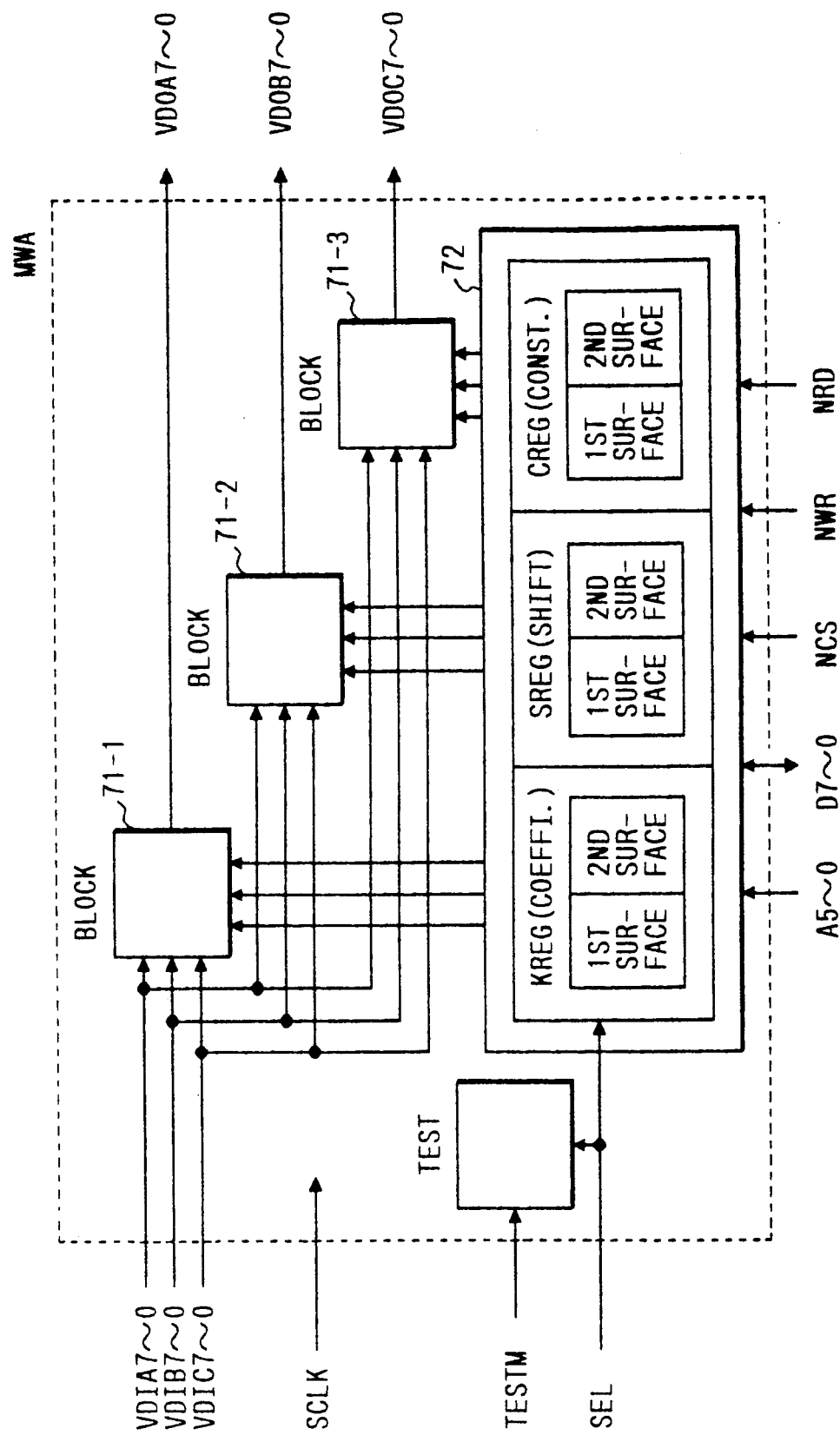
Figure 6C:
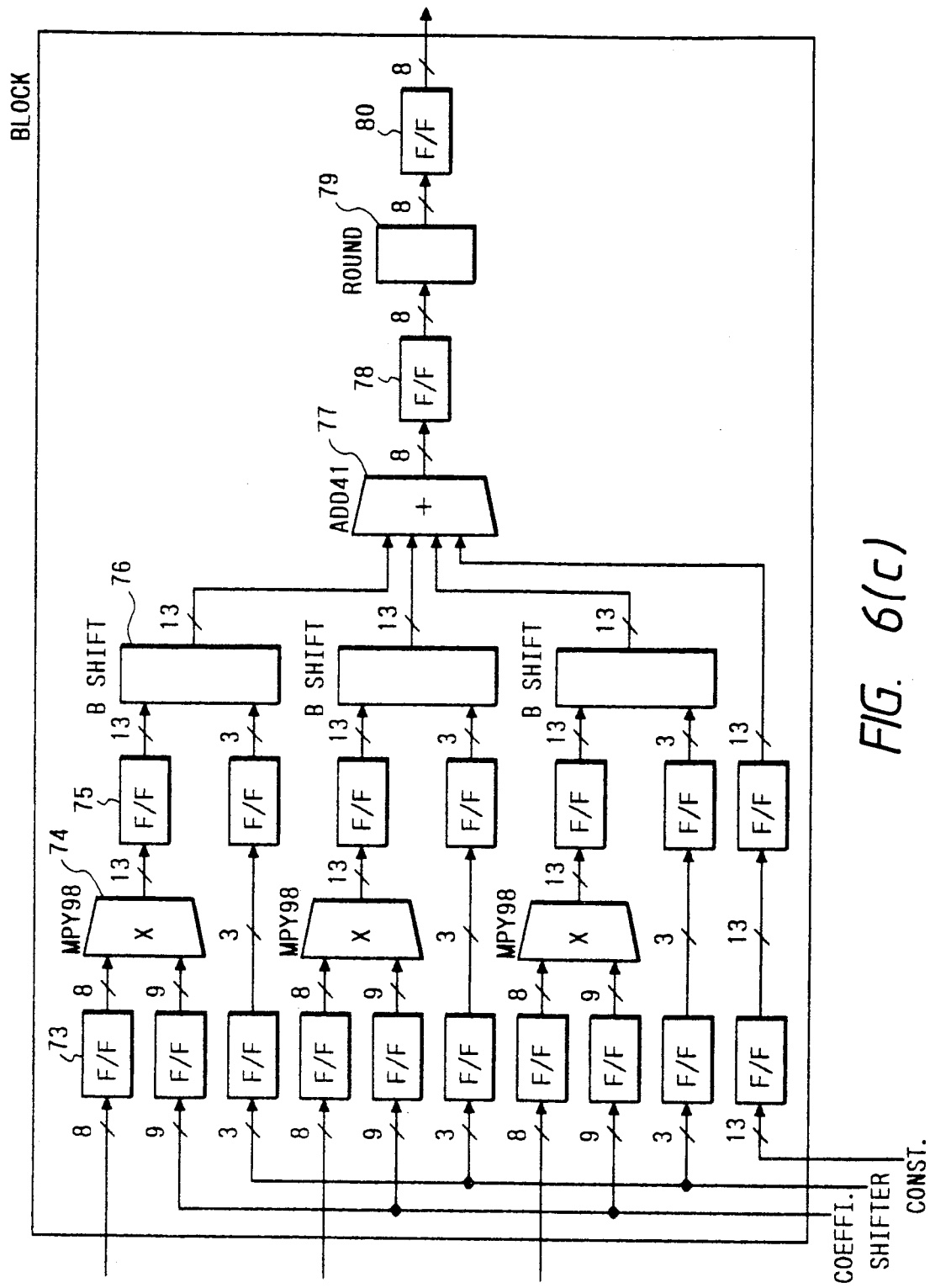

FIG. 5 is a view used to explain how data are set in the RAM. Specifically, FIG. 5(a) shows the examples of the data to be set in the respective B G R conversion tables, FIG. 5(b) shows the examples of the parameters to be set in the conversion tables, and FIGS. 5(c) and 5(d) respectively show the flow charts of the data setting processings. And, FIG. 6 is a view to explain how patterns are generated using a matrix conversion circuit. Specifically, FIG. 6(a) shows a relationship between the input and output, FIG. 6(b) shows a block diagram of the structure of the matrix conversion circuit, and FIG. 6(c) shows the structure of a block.

Referring now to FIG. 5, ENL for B, ENL for G, and ENL for R are respectively the examples of the set data when ENL 15 is used as a pattern generator in the signal processing system shown in FIG. 3.

In the example shown in FIG. 5(a), at first, at addresses )–$12_H$, a value of ENL for B is set as $AE_H$ and the values of ENL for G and ENL for R are set as $80_H$, and next at $13_H$–$14_H$, the values of all ENLs are set as $80_H$. Similarly, at addresses $15_H$–$27_H$, a value of ENL for G is set as $AE_H$, and at addresses $28_H$–$29_H$, the values of ENL for B and ENL for R are set as $80_H$, and next the values of all ENLs are set as $80_H$. In other words, there is produced a pattern in which the given data $AE_H$, $51_H$, $86_H$, and $79_H$ are allocated to one to three of ENL for B, ENL for G and ENL for R and other values are set as $80_H$ in such a manner that these values surround the address at which the values of all ENLs are set as $80_H$. 1 block consists of addresses $0$–$FF_H$ and the four given value data are arranged in a given order, thereby setting 12 kinds of data. Similarly, with respect to $100_H$-1 $FF_H$, $200_H$-2 $FF_H$, - - - - - - as well, the given value data are substituted in such a manner that $AE_H \rightarrow 93_H$, $51_H \rightarrow 6$ $CH_H$, - - - $AE_H \rightarrow 8$ $A_H$, - - - - - -, thereby setting 12 kinds of data respectively. Therefore, the CPU has, as the set data, such parameters as shown in FIG. 5(b) and is able to set the data by use of an algorithm shown in FIG. 5(c).

Parameters shown in FIG. 5(b) consist of No. 1 to No. 4 data for each of $0$–$FF_H$, $100_H$-1 $FF_H$, $200_H$-2 $FF_H$, - - - - - -. And, in a setting processing shown in FIGS. 5(c) and 5(d), these data are written sequentially.

For the above-mentioned data setting in the RAM, in the matrix conversion circuit, there are set coefficients and constants in one surface thereof for outputting Y, M and C and in the other surface thereof for outputting K in such a manner that there can be obtained such a relationship between the input and output thereof. In other words, the coefficients and constants are set in such a manner that, in one surface of the matrix conversion circuit for outputting Y, M and C, the output is 0 with respect to the input of $0-80_H$, the output is the gradation data of $12_H-FF_H$ with respect to the input of $89_H-FF_H$, while in the other surface thereof for outputting K the output is the gradation data of $FF_H-0$ with respect to the input of $0-80_H$, and the output is 0 with respect to the input of $89_H-FF_H$.

Each of the matrix conversion circuit 16a and 16b shown in FIG. 3, as shown in FIG. 6(b), includes three operation blocks 71-1 to 71-3 each of which performs conversion processings from BGR to Lab and from Lab to YMC, and a resister 72 which has a portion for coefficient, a portion for a shifter and a portion for a constant. And, the coefficient, shifter and constant are set in the register 72 from the CPU and, by use of the coefficient, shifter and constant of the register 72, the operation blocks 71-1 to 71-3 perform operation processings on input image data VDIA - VDIC.

The operation block, as shown in FIG. 6(c), is arranged in the following manner: that is, flip-flops 73, 75, 78 and 80 are used to latch the input image data, the coefficient, shifter and constant of the register 72, and other processing data; a multiplier 74 is used to multiply the input image data by a constant; a shifter 86 is used to arrange the columns of the outputs of the multiplier 74; an adder 77 is used to add together the respective outputs thereof; and, finally, a round circuit 79 is used to perform a rounding processing on the sum of the outputs added before they are output.

Thus, if, as the one surface (for YMC), the matrix coefficients and constants used to convert coordinates from the BGR signals to the YMC signals are set as:

$$\begin{bmatrix} Y \\ M \\ C \end{bmatrix} = \begin{bmatrix} 2, & 0, & 0 \\ 0, & 2, & 0 \\ 0, & 0, & 2 \end{bmatrix} \begin{bmatrix} B \\ G \\ R \end{bmatrix} + \begin{bmatrix} -255 \\ -255 \\ -255 \end{bmatrix}$$

and, as the other surface (for pure black), the matrix coefficients and constants used to convert coordinates from the BGR signals to the YMC signals are set as;

$$\begin{bmatrix} Y \\ M \\ C \end{bmatrix} = \begin{bmatrix} -2, & 0, & 0 \\ 0, & -2, & 0 \\ 0, & 0, & -2 \end{bmatrix} \begin{bmatrix} B \\ G \\ R \end{bmatrix} + \begin{bmatrix} 256 \\ 256 \\ 256 \end{bmatrix}$$

then, by means of a combination of these coefficients and constants with the ENL with the data of FIG. 5(a) set therein, for example, at addresses $0-12_H$, the data is converted into Y and is then output, at addresses $15_H-27_H$, the data is converted into M and is then output, at addresses $3F_H-51_H$, the data is converted into K and is then output, at addresses $54_H-66_H$, the data is converted into YMCK, and at $BD_H-CF_H$ the data is converted into YM (=R) and is then output. However, like addresses $13_H-14_H$, an area becomes W, in which the value of $80_H$ is set at all of the ENLs. For this reason, Y, M, C, K, B, G, and R can be respectively shot in the gradation reproducibility thereof.

Figure 7:
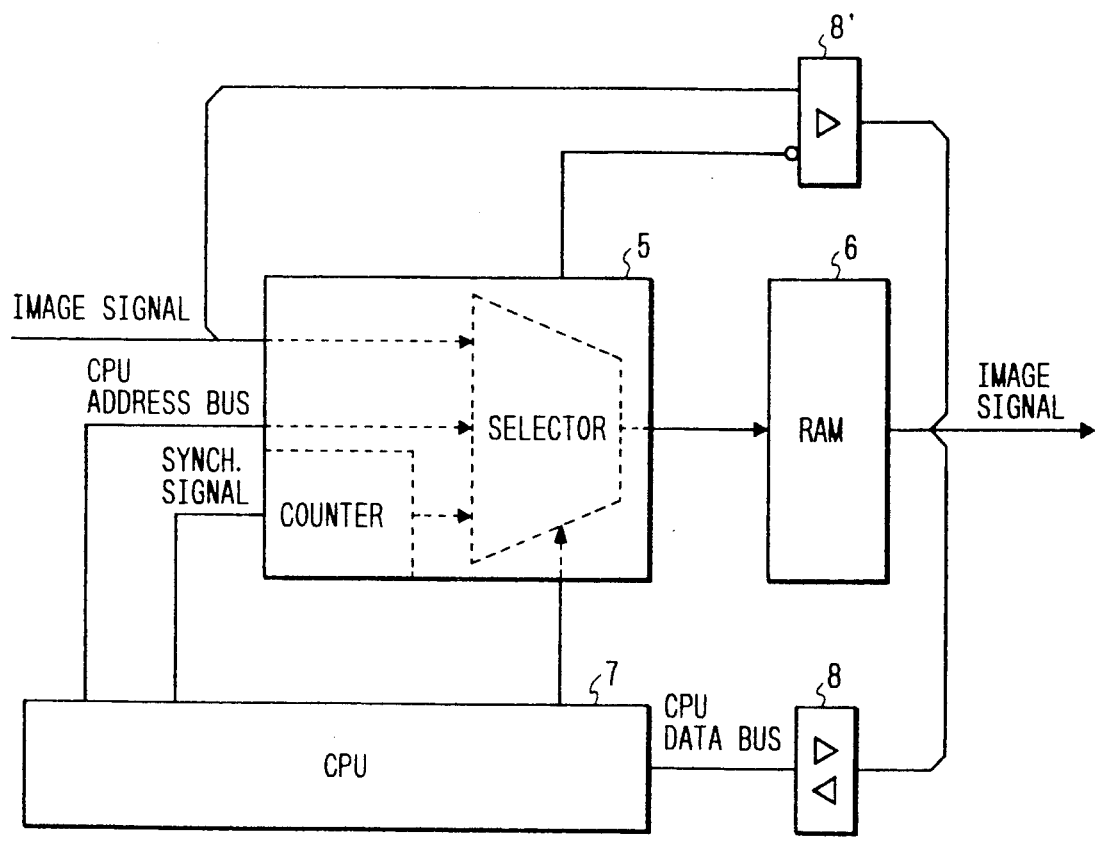
Figure 8:
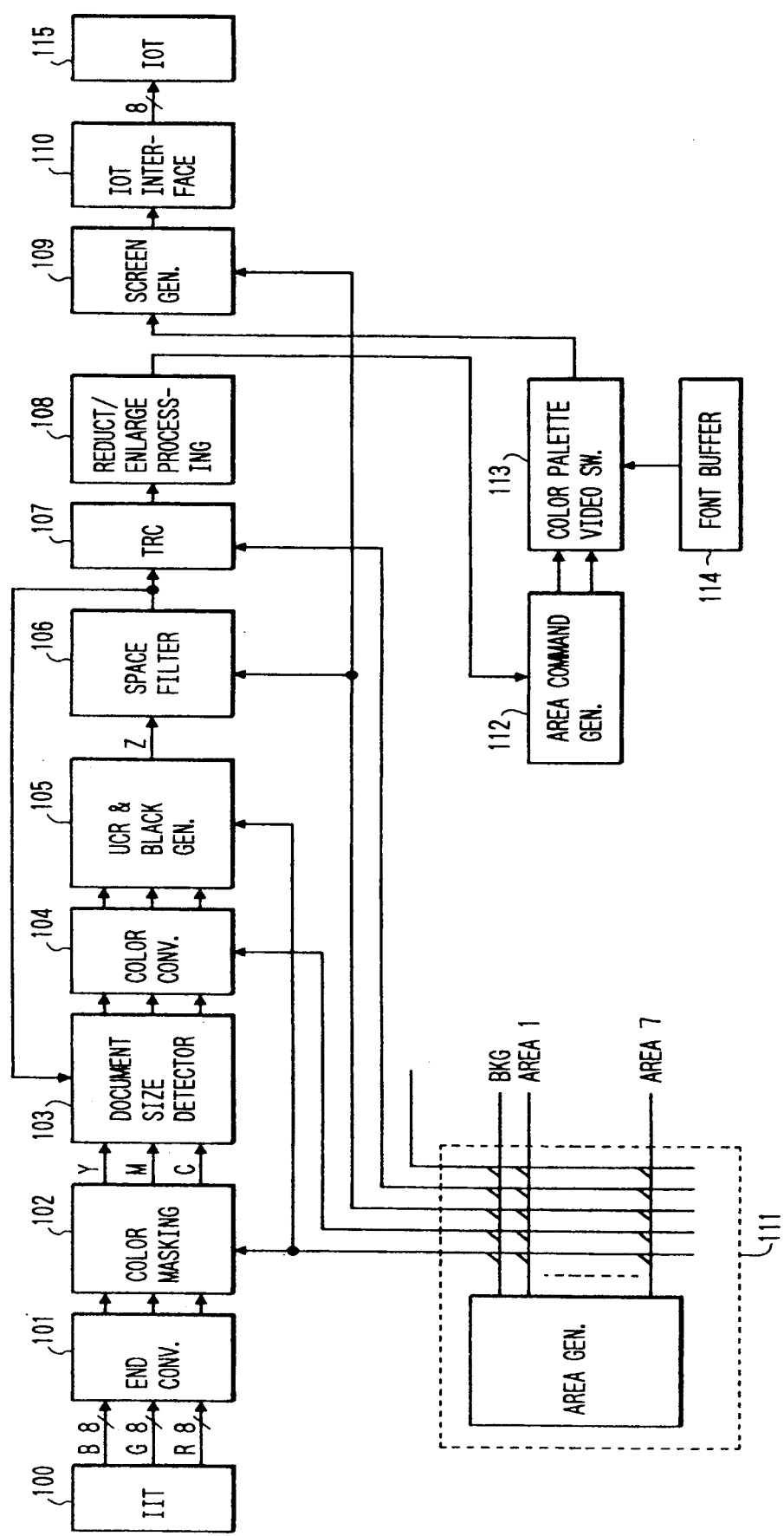

Now, FIG. 7 shows a block diagram of a structure which enables patterns to be generated and trouble shooting data to be taken in, and the structure can be employed in, for example, TRC 27 shown in FIG. 3. The present structure is different from the structure shown in FIG. 1(b) in that it includes a bus controller 8 and thus the present structure is able to write the input image data through the bus controller 8 into the RAM 6. Thanks to this, the patterns can be generated by use of ENL 15 shown in FIG. 3, and the data that is input to TRC 27 through the edit processing part 400 can be written into an internal RAM by means of the address of the CPU address bus. And after then, if the data is read into the CPU 7 by means of the CPU data bus, then the CPU 7 is able to carry out the trouble shooting and other operations. Also, if the patterns are generated and the copies thereof are then output by the TRC 27, then abnormal connections and other troubles, which could occur at the TRC 27 and its following components, can be shot as well.

Description has been given heretofore of the illustrated embodiments of the invention. However, the invention is not limited to the illustrated embodiments, but various modifications are possible. For example, in the above-mentioned embodiment, the gradation outputs of the respective colors and pure black are output by means of a combination of the ENL with the matrix conversion circuit which performs a coordinates conversion processing. However, according to the invention, the patterns can be generated by a single use of ENL or TRC. Also, in the following matrix used to convert coordinates, that is, convert L*, a*, b* signals into YMC signals, $$\begin{bmatrix} Y \\ M \\ C \end{bmatrix} = \begin{bmatrix} a_{00}, & a_{01}, & a_{02} \\ a_{10}, & a_{11}, & a_{12} \\ a_{20}, & a_{21}, & a_{22} \end{bmatrix} \begin{bmatrix} L^* \\ a^* \\ b^* \end{bmatrix} + \begin{bmatrix} A0 \\ A1 \\ A2 \end{bmatrix}$$

by setting the coefficients a** all for 0, the image signal may be cut and an arbitrary value may be set in the constant term, thereby allowing a pattern signal to flow downstream. According to this method, troubles can be detected separately before and after the matrix conversion circuit. Similarly, there can be used a matrix which converts coordinates, that is, converts BGR signals into L*, a*, b* signals. Further, in the multiplier 26 shown in FIG. 3, 0 may be set in the multiplying portion thereof and an arbitrary value may be set in the adding portion thereof to thereby be able to detect troubles similarly.

As has been described hereinbefore, according to the invention, the synchronous signal is counted by the address generation means to thereby generate the addresses of the conversion table, and the control means is used to set the data of the conversion table and switch the addresses of the conversion table from the image data over to the output of the address generation means to thereby generate the patterns. Thanks to this, without providing a special pattern generator, a shooting pattern can be generated simply by setting the pattern generating data in the conversion table and by addition of the address generation means. In addition, by setting the data in the conversion table and the coordinates conversion matrix of BGR→Lab→YMC, the output of the color desired and the output of pure black are made possible, so that troubles can be shot as well as the color gradation reproducibility and fineness can also be confirmed.

Further, by previously determining the sequence and algorithm to be set in the convention table, the data of the conversion table can be set by giving only the parameters for pattern generation. This can reduce the memory capacity for generation of the parameters. Still further, since different patterns can be generated by means of the same conversion table only by changing the count mode of the address generation means, a structure for generation of the patterns can be simplified.

What is claimed is:

1. A pattern image generation device for a color image processing system comprising:
    an image conversion processing means for converting an input image data signal to output a converted image data, said image conversion processing means including rewritable memory means and address control means for controlling a memory address of said memory means; and
    an operation processing means for controlling the operation of said image conversion processing means;
    said address control means including a variable address generation means for generating a variable address signal in accordance with a synchronizing signal output from said operation processing means, and a signal select means for selecting one of said input image data signal, an address signal output from said operation processing means and said variable address signal in accordance with a control signal from said operation processing means, and wherein said operation processing means outputs to said memory means one of conversion data used to convert said input image data signal to be set in said memory means and predetermined pattern generation data to be set in said memory means in synchronization with said control signal, and said operation processing means controls said signal select means to select one of said input image data signal and said variable address signal.

2. A pattern image generation device for an image processing system as defined in claim 1 wherein said variable address generation means comprises a plurality of count modes to select a pattern to be generated by switching the count modes.

3. A pattern image generation device for an image processing system as defined in claim 2 wherein said variable address generation means comprises a mode to update an address every given block size.

4. A pattern image generation device for an image processing system as defined in claim 2 wherein said variable address generation means comprises a mode to inert a line by means of different repeat addresses every given line.

5. A pattern image generation device for an image processing system as defined in claim 2 wherein said variable address generation means comprises a mode to generate the leading addresses of the respective lines in a sequentially staggering manner.

6. A pattern image generation device for an image processing system as defined in claim 1 wherein said image conversion processing part comprises a conversion table used to convert input image data, said conversion table including a circuit used to write the input image data, and said address control means controlling a write address to write the input image data into said conversion table and to read data therefrom.

7. A pattern image generation device for an image processing systems as defined in claim 1 wherein said address control means comprises a plurality of pattern generating data for every given address width, said address control means writing said plurality of data and fixed data into said conversion table in a given sequence.

8. A pattern image generation device for an image processing system as defined in claim 1 wherein said conversion processing means comprises a matrix conversion circuit for conversion of the coordinates of the image data to generate patterns by setting matrix coefficients and constants by means of pattern generating data.

* * * * *

UNITED STATES PATENT AND TRADEMARK OFFICE
CERTIFICATE OF CORRECTION

PATENT NO. : 5,309,258
DATED : May 03, 1994
INVENTOR(S) : Katsuyuki Kouno et al.

It is certified that error appears in the above-indentified patent and that said Letters Patent is hereby corrected as shown below:

Claim 4, Column 16, Line 11 "inert" should read --invert--.

Claim 7, Column 16, Line 27 "systems" should read --system--.

Signed and Sealed this

Fourteenth Day of February, 1995

Attest:

BRUCE LEHMAN

Attesting Officer     Commissioner of Patents and Trademarks